(Model.)
D. E. LONGSDORF.
MACHINE FOR CUTTING GREEN CORN FROM THE COB.
No. 276,054. Patented Apr. 17, 1883.
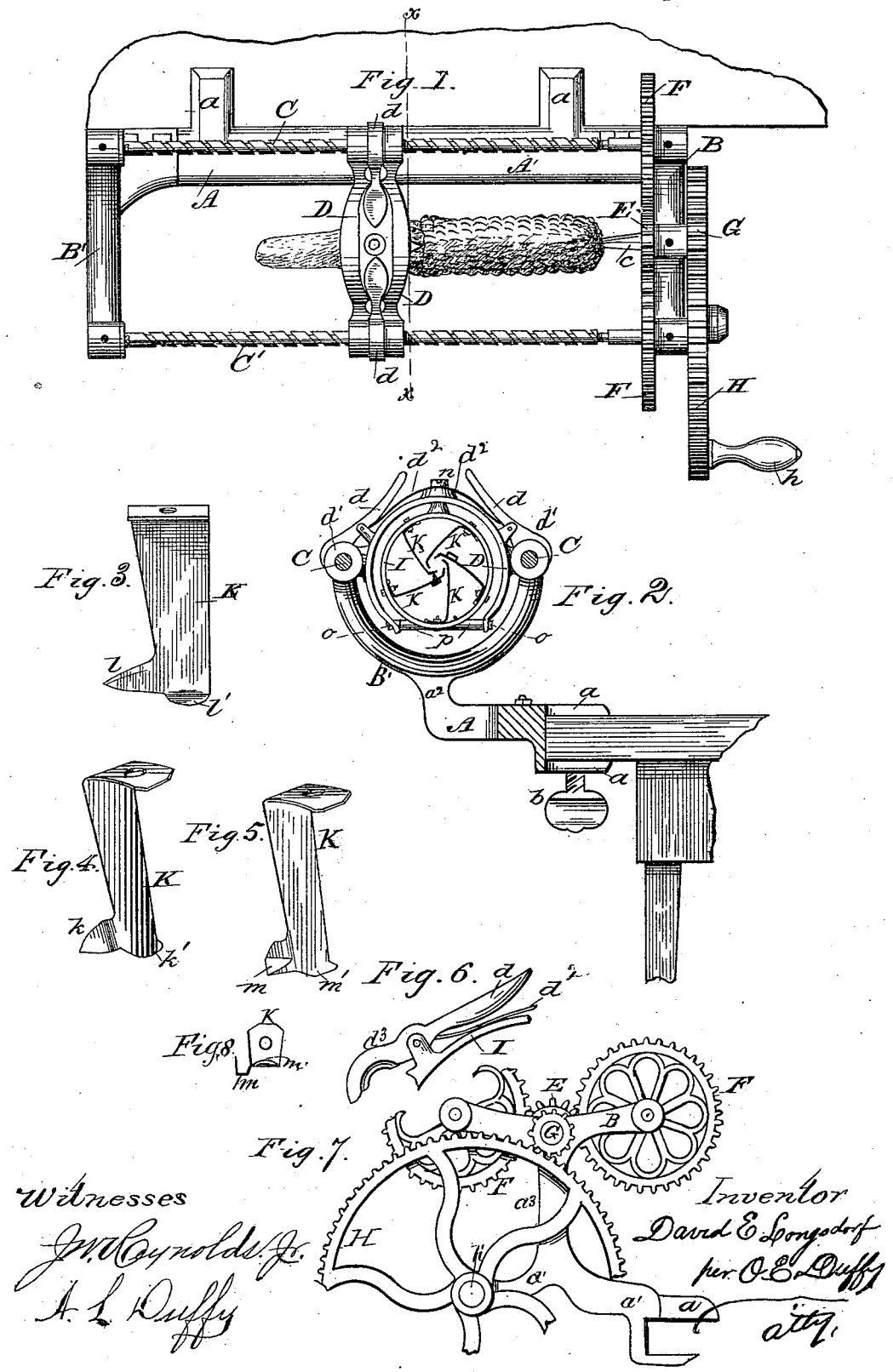

UNITED STATES PATENT OFFICE.

DAVID E. LONGSDORF, OF MECHANICSBURG, PENNSYLVANIA.

MACHINE FOR CUTTING GREEN CORN FROM THE COB.

SPECIFICATION forming part of Letters Patent No. 276,054, dated April 17, 1883.

Application filed January 8, 1883. (Model.)

*To all whom it may concern:*

Be it known that I, DAVID E. LONGSDORF, of Mechanicsburg, in the county of Cumberland and State of Pennsylvania, have invented certain new and useful Improvements in Machines for Cutting Green Corn from the Cob; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a machine for removing the grains from the cobs of green corn, its object being to divide the grains smoothly and regularly into small pieces while cutting them from the cob.

The invention consists in certain novel combinations of devices for holding and feeding the cutting-knives in proper position with relation to a suitably-supported and rapidly-rotating ear of corn, and in a novel construction and arrangement of the cutting-knives, all as hereinafter particularly described, and pointed out in the appended claims.

In the accompanying drawings, Figure 1 is a top view of a green-corn cutter constructed according to my invention, a portion of a table to which the machine is attached being also shown. Fig. 2 represents a cross-section of the machine on the line $x\,x$ of Fig. 1. Figs. 3, 4, and 5 are detached views of the several cutting-knives. Fig. 6 is a detached view of one of the clutches which engage the feed-screw. Fig. 7 is an end view of a portion of the machine, illustrating the arrangement of the driving and motion-transmitting gear-wheel. Fig. 8 is an end view of one of the cutting-knives, which will be hereinafter specially referred to.

The letter A indicates the main supporting-frame, consisting of the base-bar A', having clamping-ears $a\,a$, projecting from one edge thereof, and arranged in pairs in the usual manner, for embracing the edge of the table or other support, to which they may be secured by means of clamp-screws, as shown at $b$. From the opposite ends of this base-bar project arms $a'\,a^2$, the former carrying an upwardly-projecting standard, which supports the cross-bar B, and the latter carrying a bifurcated standard, B'. The upturned ends of this bifurcated standard are provided with bearings to receive the journals at the outer ends of the feed-screws C C', the inner ends of said screws having their journal-bearings in opposite ends of the cross-arm B. These screws have fixed upon them, near the cross-arm B, gear-wheels F F, which mesh with an intermediate pinion, E, fixed upon a short shaft journaled in the arm B, and carrying at its outer end a second pinion, G, meshing with the main driving-gear H, which turns upon a pin, $h'$, projecting outwardly from the arm $a'$, as shown in Fig. 7. From the inner end of the short shaft which carries the pinions E and G projects a bladed spike, $c$, upon which the ear of corn to be operated upon is to be impaled, as shown in Fig. 1.

The letter D designates the traveling cutter-frame, which is arranged between the screws C C', and carries within it the ring I, to which the cutting-knives are attached. The main cutting-frame consists of an arch-like bar or plate having its feet or lower ends approaching each other somewhat, and said arch-like bar is provided at opposite sides with ears $d'$, which embrace the screws C C', respectively. To small lugs or standards projecting from the cutter-frame are pivoted thumb-levers $d$, having their outer ends formed as clutches $d^3$, which are adapted to engage with the threads of the screws C C', and are normally held in engagement therewith by springs $d^2$. By depressing the inner ends of these levers the frame may be freed from the feeding action of the screws and adjusted in either direction, as described. The knife-carrying ring I has, at its lower edge, oppositely-projecting lugs $p$, having sockets in their ends to receive the screws $o$, which pass through the lower ends of the arched cutter-frame D, said ring having also, at its upper edge, a lapped lug, which receives the screw $n$, which passes through the top of the cutter-frame, these several screws holding the knife-ring firmly in place and permitting its removal when desired. The yielding or spring knife-arms are indicated by the letter K. They have their outer ends secured to the inner periphery, and their inner ends project toward the center of the ring. For a full understanding of the construction of these knives, reference must be had to the detail Figs. 3, 4, and 5. The knife-arms are simply flat spring-strips bent at their outer ends, as shown, to afford means for attachment to the ring. From one edge of each knife-arm, near its inner end, projects a blade. In Fig. 3 the blade $l$ is pointed and projects straight out from the edge of its arm, said arm having a lip, $l'$, bent laterally at its end. In Fig. 4 the blade $k$ is bent laterally outward, and then forward in the same direction as the blade in Fig. 3. In Fig. 5 the blade is bent laterally from the edge of its arm, and then directly forward, and has its tip bent back opposite and parallel, or nearly so, with its first bend. There are five knives in the ring, preferably, and they are arranged as follows: One of the knives is shaped as shown in Fig. 5, and when placed in the ring its blade projects in advance of all the others as the cutter-frame moves upon the ear of corn, and the inwardly-bent tip of the blade $m$ points directly toward the ear and cuts a spiral line about the ear and into the grains. There are two knives of the character as shown in Fig. 4, and their laterally-set knives $k$ cut off the outer portion of the grains which have been divided from the general mass by the spiral line formed by the preceding knife $m$. There are also two knives of the character shown in Fig. 3, set opposite each other in the ring, and their straight projecting blades $l$ cut off from the ear the remaining inner portions of the grains forming the spiral row divided off by the first knife. The bent tip of the knife $m$ should be kept very sharp, so that it will cut cleanly through the grains without mashing them or knocking off whole grains from the ear, and the following knives are set at such distance behind the leading knife that they will only cut evenly through the spiral row of corn which the leading knife divides off from the rest. By this arrangement of the knives it will be observed that I secure the clean and regular subdivision of the grains without mangling them. The lips $l'$, $k'$, and $m'$ remove the cut-away portions of the grain and prevent them from accumulating under the knives. The knives having been properly set in their ring and the ear of corn placed upon the supporting-spike, the driving-wheel H is to be turned in a proper manner to cause the cutter-frame to advance, and when the cutting of the ear of corn is finished the cutter-frame may be set free by depressing the small lever $d$, and moved back a sufficient distance to allow the cob to be removed and a fresh ear of corn placed upon the spike.

Having now described my invention and the operation thereof, I claim—

1. In a green-corn cutter, the combination, with a rotary ear-holder and means for rotating the same, of two parallel screws connected with the ear-holder by intermediate gears, and a cutter-frame supported between and in engagement with said screws, and arranged to be moved thereby for bringing suitable cutting-knives into position for cutting the corn, substantially as described.

2. In a green-corn cutter, the combination, with the feed-screws C C', of the cutter-frame supported between said screws by ears on the frame, the clutching-levers $d$ engaging said screws, and held in engagement therewith by the springs $d^2$, whereby the cutter-frame may be freed from the feeding action of the screws and adjusted in either direction, as described.

3. In a green-corn cutter, the combination of the feed-screws and motion-transmitting mechanism, as described, with the arched cutter-frame supported between the feed-screws, said cutter-frame adapted to be freed and adjusted, as described, and having secured through the top and bottom thereof the knife-carrying ring, the knives being formed by bending the blades, and provided with the laterally-bent lips, and are secured and arranged within the ring relatively to each other, substantially as herein shown and described.

4. In a green-corn cutter, the combination, with a rotary ear-support and means for retaining the same, of a series of spring-supported knives of different lengths, arranged to cut the corn successively in layers closer to the cob, substantially as described.

5. In a green-corn cutter, the combination, with the knives arranged to cut the grains transversely, of the leading knife having a point bent inward and arranged to cut a spiral line through and about the corn in advance of the other knives, and suitable means for forcing said knives upon the rotating ear, substantially as described.

6. The combination, with the screw-shafts C C', provided with gear-wheels, of the short shaft carrying an intermediate pinion meshing with both of said wheels, the ear-supporting spike projecting from the inner end of said shaft, the cutter-frame mounted between and in engagement with said screw-shafts, and a series of spring-knives supported within said cutter-frame, and suitable means for communicating rotary motion to the ear-spike and screw-shafts, substantially as described.

In testimony that I claim the foregoing as my own I affix my signature in presence of two witnesses.

DAVID E. LONGSDORF.

Witnesses:
O. E. DUFFY,
B. F. MORSELL.